United States Patent [19]

Moloney et al.

[11] 4,355,546

[45] Oct. 26, 1982

[54] RECIPROCABLE PLUNGER FUEL INJECTION PUMP

[75] Inventors: Kieron J. Moloney, Cheltenham; Gerald S. Thomas, Longlevens, both of England

[73] Assignee: Lucas Industries Limited, Birmingham, England

[21] Appl. No.: 165,672

[22] Filed: Jul. 3, 1980

[30] Foreign Application Priority Data

Aug. 9, 1979 [GB] United Kingdom ................ 7927794

[51] Int. Cl.3 ............................................ F16H 21/14

[52] U.S. Cl. ..................................................... 74/569

[58] Field of Search .................... 74/55, 569; 417/490, 417/498, 499, 437

[56] References Cited

U.S. PATENT DOCUMENTS

| | | | |
|---|---|---|---|
| 2,465,046 | 3/1949 | Tabb | 417/499 |
| 2,548,342 | 4/1951 | Brook et al. | 74/569 X |
| 3,358,660 | 12/1967 | Cornell | 74/569 X |
| 3,609,070 | 9/1971 | Bagshaw | 417/494 |
| 3,831,457 | 8/1974 | Kern | 74/569 |
| 4,204,814 | 5/1980 | Matzen | 74/569 |

FOREIGN PATENT DOCUMENTS

| | | | |
|---|---|---|---|
| 759458 | 4/1954 | Fed. Rep. of Germany | 74/569 |

*Primary Examiner*—Lawrence J. Staab

[57] ABSTRACT

A reciprocable plunger fuel injection pump has a plunger extending from a pump barrel. A spring abutment is mounted at the outer end of the plunger and carries a thrust member engageable with the radiussed end of the plunger and by an actuating device such as a cam. A ring is carried by the plunger for engagement with an annular surface in a bore in the abutment through which the plunger extends. The abutment and the thrust member can rock about the end of the plunger to absorb side thrust applied by the actuating device.

3 Claims, 3 Drawing Figures

RECIPROCABLE PLUNGER FUEL INJECTION PUMP

This invention relates to a reciprocable plunger fuel injection pump of the kind comprising a pumping plunger reciprocable within a bore from which it extends, a spring abutment mounted about the outer end of the plunger, means carried by the outer end of the plunger and engageable with the abutment whereby a spring engaging with the abutment biasses the plunger outwardly, the plunger being movable inwardly in use, by the action of a movable member carried by the associated engine.

In a known construction of pump the plunger is provided with a flattened end portion which is loosely trapped between the spring abutment and the base wall of a cup shaped member slidable within a bore defined in the housing of the pump. The movable member which may be a rocker or a cam, can impart a side ways thrust on the cup shaped member but since this is guided for movement within the bore in the housing, there is no risk of the end portion of the plunger being trapped between the spring abutment and the base wall of the cup shaped member such as would prevent or impair angular adjustment of the plunger for the purpose of adjusting the amount of fuel supplied. For the reason of lack of space occasions can arise where it is not possible to provide the cup shaped member. The cup shaped member is replaced by a thrust member engaging with the spring abutment and engageable by the end of the plunger there is therefore a risk that the side thrust imparted to the thrust member will tilt the thrust member and the spring abutment and will trap the flattened end portion of the plunger and thereby preventing it from being moved angularly.

The object of the invention is to provide such a pump in a simple and convenient form.

According to the invention in a pump of the kind specified the spring abutment is of generally cylindrical form and has a flange for engagement by the spring, the abutment defining a stepped bore into which the outer end portion of the plunger extends, the end of the plunger being of part spherical form for engagement with a thrust member carried by the spring abutment, the bore defining an inclined annular surface which inclines outwardly towards the thrust member and the plunger carrying means engageable with said surface whereby the thrust member and spring abutment can rock relative to the plunger under the action of forces applied to the thrust member.

Examples of pump in accordance with the invention will now be described with reference to the accompanyng drawings in which.

Figure 1:
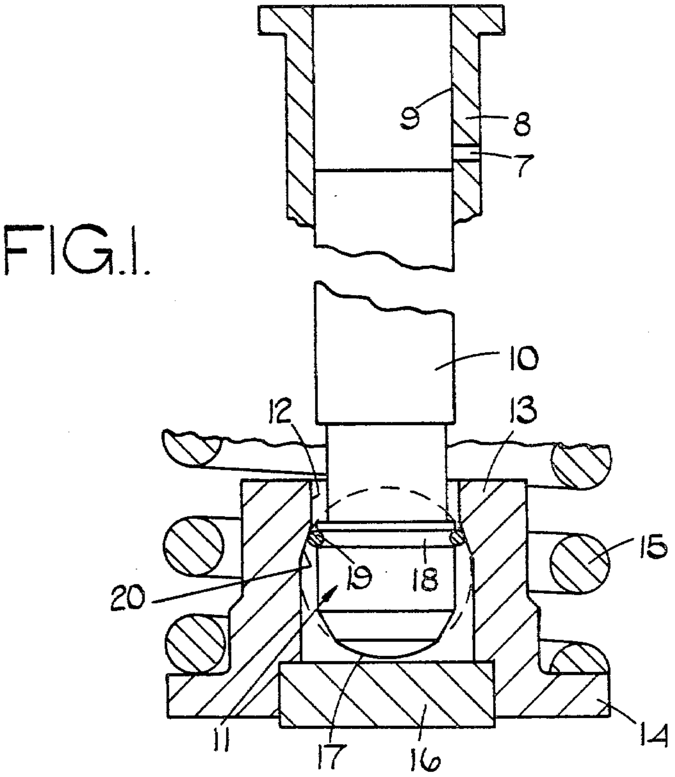
FIG. 1 is a part sectional side elevation of part of the pump.

With reference to FIG. 1, the pump includes a plunger 10 which is located within a bore 9 formed in a pump barrel 8. The barrel has a port 7 or ports formed in the wall and which communicate with a fuel gallery (not shown) to which fuel is supplied at low pressure. The port 7 is covered by the end of the plunger 10 as it is moved inwardly and fuel is then displaced through an outlet. One or both ports 7 is uncovered by a helical or like groove (not shown) on the plunger as the plunger continues to move inwardly and the further flow of fuel through the outlet ceases. The angular setting of the plunger determines the instant at which flow of fuel through the outlet ceases during the inward movement of the plunger. Following the inward movement, the plunger is moved outwardly and a fresh supply of fuel is drawn into the bore through said ports. The outward movement of the plunger is effected by a spring as will be described and the inward movement by a cam or rocker.

The plunger projects from the bore 9 and the end portion generally indicated at 11 extends into a bore 12 formed in a generally cylindrical spring abutment 13. The abutment has a peripheral flange 14 for engagement by one end of a coiled compression spring 15 which loads the plunger in the outward direction. Inward movement of the plunger against the action of the spring 15 is effected by a rocker or cam (not shown) which forms part of the associated engine. The rocker or cam bears a thrust member 16 which is located within a recess in the spring abutment and which closes the end of the bore 12.

The end of the plunger has a part spherical surface 17 which engages with the thrust member to effect inward movement of the plunger, the thrust member having a plane surface for engagement with the plunger. The bore 12 has two diameters with the wider portion of the bore being adjacent the thrust member. The narrower portion of the bore is sized such that the end portion 11 of the plunger can be passed therethrough. Moreover formed in the peripheral surface of the end portion of the plunger is a circumferential groove 18 in which is located a split retaining ring 19 formed from round section wire. The position and size of the groove and the ring is such that its outer extremity lies on the projected portion of the sphere of which the surface forms part. The projected portion of the sphere is shown in dotted outline.

The step in the bore 12 is tapered and it is arranged such that the annular surface 20 of the step is substantially tangential to the projected portion of the sphere. It is arranged that the plunger has a limited degree of axial play relative to the abutment and thrust member, this being shown by the clearance between the spherical surface 17 and the thrust member. The plunger is provided with means (not shown) for imparting angular movement to the plunger such means being in the form of a radial peg engaging within a slotted sleeve member.

In operation, when the thrust member is engaged by the cam or rocker the spring abutment and the plunger are moved and any side thrust is accommodated by tilting of the spring abutment relative to the plunger. The plunger however remains free to be moved angularly even though there may be some side thrust imparted thereto. When the inward movement of the plunger is completed the spring 15 urges the abutment outwardly and like movement is imparted to the plunger by way of the surface 20 and the ring 19. The plunger is free to be moved angularly during its outward movement. The surface 20 should strictly speaking be spherical and if this were the case the ring would have line contact with the surface 20 whatever the position of the abutment. It is found however that a conical surface suffices providing the aforesaid axial play is provided. It will be understood that the surface can be made to spherical form if so desired.

Figure 2:
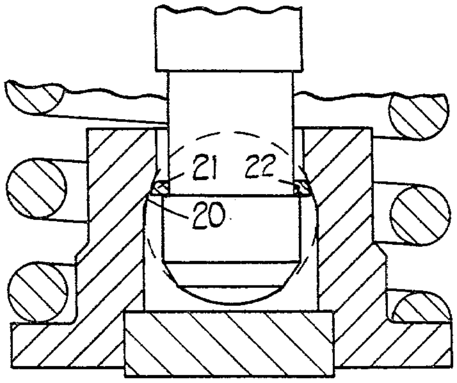
FIGS. 2 and 3 are views similar to FIG. 1 showing modifications.

In the arrangement shown in FIG. 2 the ring 19 is replaced by a ring 21 having a part spherical surface for engagement with the surface 20. Moreover, instead of being located in a groove, the ring bears against a step 22 defined in the end portion of the plunger.

Figure 3:
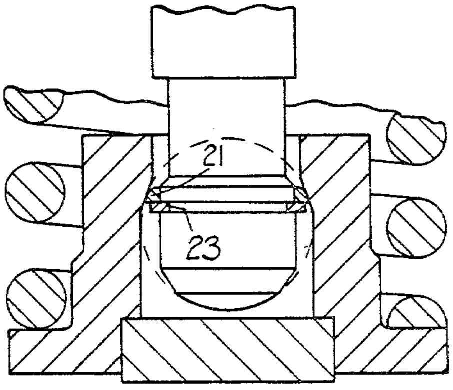

A similar ring 21 is used in the arrangement shown in FIG. 3 but in this case a split ring 23 of rectangular cross section is located in a groove defined in the end portion of the plunger.

We claim:

1. A reciprocable plunger fuel injection pump comprising a pumping plunger reciprocable within a bore from which it extends, a spring abutment mounted about the outer end of the plunger, said spring abutment being of generally cylindrical form and having a flange for engagement by a spring, a stepped bore defined in the abutment and into which the outer end portion of the plunger extends, the outer end of the plunger being of part spherical form, a thrust member carried by the spring abutment for engagement with the outer end of the plunger, an inclined annular surface formed by the step in the bore, said surface inclining outwardly towards the thrust member, and a ring defining a part spherical surface engageable with said inclined surface carried by the plunger, the portion of the spherical surface of the ring which engages with said inclined surface lying on the projected portion of a sphere of which the part spherical end of the plunger forms part, whereby the thrust member and spring abutment can rock relative to the plunger under the action of forces applied to the thrust member.

2. A pump according to claim 1 in which said inclined surface is tangential to said sphere and axial play is provided between the plunger and thrust member.

3. A pump according to claim 1 in which said inclined surface is of part spherical form.

* * * * *